(12) United States Patent
Sceats et al.

(10) Patent No.: US 6,636,665 B1
(45) Date of Patent: Oct. 21, 2003

(54) GRATING WRITING SYSTEM

(75) Inventors: Mark G Sceats, Pyrmont (AU); Leon Poladian, Glebe (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/719,425

(22) PCT Filed: May 26, 1999

(86) PCT No.: PCT/AU99/00403

§ 371 (c)(1),
(2), (4) Date: Feb. 6, 2001

(87) PCT Pub. No.: WO99/67664

PCT Pub. Date: Dec. 29, 1999

(30) Foreign Application Priority Data

Jun. 22, 1998 (AU) .............................................. PP4258

(51) Int. Cl.⁷ ................................................ G02B 6/34
(52) U.S. Cl. ............................. 385/37; 385/10; 359/10
(58) Field of Search ............................... 385/37, 5, 10, 385/3, 25, 27, 39; 359/10, 34

(56) References Cited

U.S. PATENT DOCUMENTS

| | | | |
|---|---|---|---|
| 4,725,110 A | * 2/1988 | Glenn et al. ................... | 356/32 |
| 4,807,950 A | * 2/1989 | Glenn et al. ................... | 359/34 |
| 5,388,173 A | * 2/1995 | Glenn ........................... | 359/10 |
| 5,604,829 A |   2/1997 | Bruesselbach | |
| 5,949,943 A | * 9/1999 | Watanabe et al. .............. | 385/11 |
| 6,314,220 B1 | * 11/2001 | Mossberg et al. ........... | 359/130 |
| 6,314,221 B1 | * 11/2001 | Riant et al. .................. | 385/127 |
| 6,384,977 B1 | * 5/2002 | Laming et al. .............. | 359/570 |

FOREIGN PATENT DOCUMENTS

| | | | |
|---|---|---|---|
| DE | 19605062 | 8/1997 | ............ G02B/6/34 |
| EP | 0843186 | 5/1998 | ............ G02B/6/16 |
| GB | 2295689 | 6/1996 | ............ G02B/6/00 |

* cited by examiner

*Primary Examiner*—Frank G. Font
*Assistant Examiner*—Kevin Kianni
(74) *Attorney, Agent, or Firm*—Ladas & Parry

(57) ABSTRACT

A method of forming a complete grating structure on a photosensitive waveguide is disclosed comprising the steps of: (a) writing an initial portion of the grating structure on the waveguide; (b) testing the properties of the initial portion to determine a series of parameters of the initial portion; (c) utilizing the parameters to alter the characteristics of a subsequently written portion of the grating structure to provide for an improved form of grating structure; (d) iterating the steps (a) to (c) so as to form the complete grating structure. The writing can be performed utilizing a coherence pattern formed from the interference of two coherent beams on the waveguide. The characteristics can include the intensity or phase of the subsequently written portion. The testing may include determining the spectral reflectance response of the initial portion or determining the spectral phase delay of the initial portion.

10 Claims, 2 Drawing Sheets

GRATING WRITING SYSTEM

FIELD OF THE INVENTION

The present invention relates to the construction of grating and other structures in photosensitive waveguides such as optical fibre devices.

BACKGROUND OF THE INVENTION

The creation of a grating in a photosensitive waveguide material utilising the interference pattern from two interfering coherent UV beams is well known. This technique for construction of Bragg gratings is fully described in U.S. Pat. No. 4,725,110 issued to W H Glenn et. al. and U.S. Pat. No. 4,807,950 issued to W H Glenn et. al.

Bragg grating structures have become increasingly useful and the demand for longer and longer grating structures having higher and higher quality properties has lead to the general need to create improved grating structures.

PCT patent application No. PCT/AU96/00782 by Ouellette et. al. discloses an improved low noise sensitivity interferometric arrangement which operates on a "Sagnac loop" type arrangement.

Australian Provisional Patent Application No. PP3816 by Stepanov et. al., assigned to the present applicant, discloses an advanced form of interferometric writing system utilising a modulator to control the position of an interference pattern on a fibre.

Unfortunately, there is an ever present need for providing further improved grating structures.

SUMMARY OF THE INVENTION

It is an object of the present invention to provide for an improved grating writing system.

In accordance with a first aspect of the present invention, there is provided a method of forming a complete grating structure on a photosensitive waveguide comprising the steps of: (a) writing an initial portion of the grating structure on the waveguide; (b) testing optical properties of the initial portion to determine a series of parameters of the initial portion; (c) utilizing the parameters as a feedback to alter the characteristics of a subsequently written portion of the grating structure to provide for an improved form of grating structure; (d) iterating the steps (a) to (c) so as to form the complete grating structure.

The writing can be performed utilizing a coherence pattern formed from the interference of two coherent beams on the waveguide. The characteristics can include the intensity or phase of the subsequently written portion. The testing may include determining the spectral reflectance transmittance, or group delay response of the initial portion and of subsequently written portions.

The step (a) further can comprise the step of locally perturbing the intensity, phase or frequency of the grating structure and the step (b) can comprise measuring the local perturbation. The local perturbation can comprise a periodic modulation and the testing step further can comprise measuring sum and difference frequencies for the modulation.

The testing can comprise averaging portions of the reflectance spectrum, transmittance spectrum and group delay spectrum of the initial portion and of subsequently written portions.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, the process of writing of a grating structure is monitored via a feedback loop and the feedback loop is utilised to alter the writing parameters so as to provide for a high quality grating structure.

In the known systems aforementioned, the grating writing system is utilised to write a local region of the grating and various techniques disclosed in the aforementioned applications are utilised to extend the grating structure. When utilising these methods, a local region of the grating is typically written to give a local Bragg wavelength $L(z)$ of a strength $K(z)$. The desired wavelength of $L(z)$ can be set by the control of the interferometric arrangement and the strength $K(z)$ can be determined by the residence time of the writing beam on the fibre in addition to the writing beam strength.

With any physical arrangement however certain errors are likely to occur due to the non-ideal conditions. For example, variations in the interferometer may give an error in the pitch. Variations in the laser properties and the propagating mode effective index are also likely to cause further noise. These variations are generally not predictable and may have significant effects in the grating properties, for example in the Q of a high finesse cavity or the group delay ripple of a dispersion compensator. These errors will lead to an actual Bragg wavelength $L'(z)$ and strength $K'(z)$. Hence the error $\delta L(z)$ and $\delta K(z)$ can be given as follows:

$$\delta L(z) = L'(z) - L(z).$$

$$\delta K(z) = K'(z) - K(z).$$

In the embodiment of the invention a feedback loop is provided so as to provide for an ongoing monitoring of the state of the grating structure. The feedback loop can be utilised in many different ways but preferably is provided in a real time manner so as to modify the written spectrum to provide for an improved result.

Figure 1:
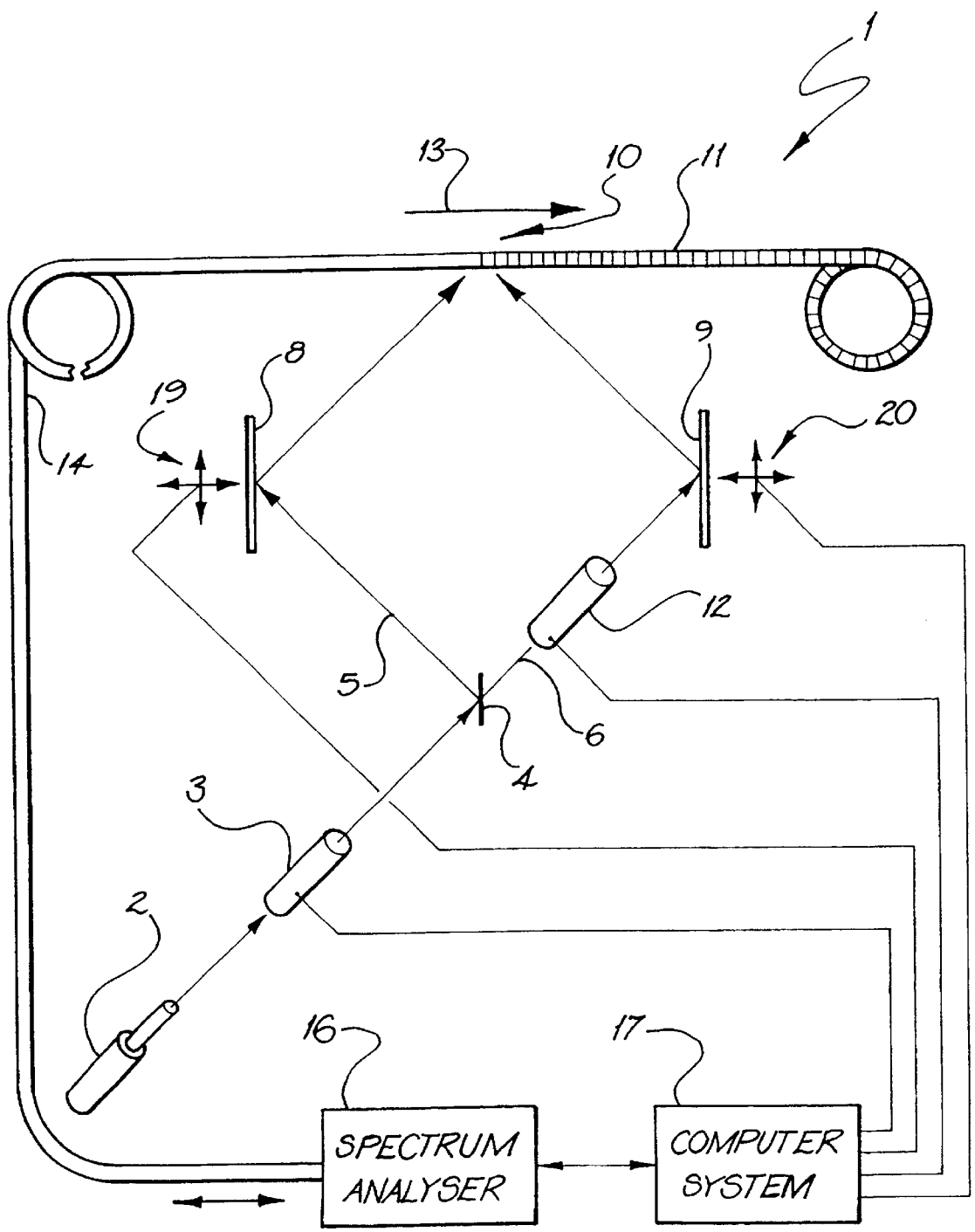
FIG. 1 illustrates schematically the arrangement of a first embodiment of the present invention.

Turning initially to FIG. 1, there is illustrated a first embodiment which comprises an interferometric grating writing apparatus constructed in accordance with the principles as outlined in the aforementioned disclosure by Glenn et al as modified by Stepanov et al. In this arrangement 1, a UV laser 2 outputs a beam which is modulated by a modulating element 3. The output from modulator 3 is forwarded to a beam splitting device 4 which splits the input beam into two beams 5, 6. The beams 5, 6 are reflected by mirrors 8, 9 so that they interfere in a grating writing region 10 at which is placed a fibre 11 into which a grating is to be written. In the aforementioned arrangement by Stepanov et al a phase modulator 12 is utilised so as to modify the phase of the two beams 5, 6 so that the interference pattern remains stable in the reference frame of the fibre 11 as it is transported in the direction 13. In this embodiment, one end 14 of the fibre 11 is interconnected to an analyser 16 which can analyse and digitally record the desired reflection characteristics. Preferably, the analyser 16 is connected to the end of fibre 11 to which new portions of the grating are written. Alternatively, the analyser 16 can be connected to the other end of the fibre, or two analysers can be simultaneously connected at both ends of the fibre. The analyser or analysers measure the reflection spectrum or a portion thereof or they measure the transmittance spectrum or a portion thereof or they measure the group delay spectrum or a portion thereof. The analyser 16 is connected to a computer system 17 which performs an analysis of the characteristics. The computer system 17 is adapted to select the portion or portions of the reflectance, transmittance or group delay spectra which best monitors the state of the grating structure.

The computer system 17 is adapted to control various devices so as to control the phase and intensity of the interference pattern 10. These devices can include the intensity modulator 3, the phase modulator 12 and translatable stages as indicated schematically 19, 20 upon which the mirrors 8, 9 can be mounted. The computer system 17 can thereby control the phase and intensity of the interference pattern in the region 10 at any particular stage. The computer system 17 can utilise various techniques in changing the intensity and power of the interference pattern in the region 10. In a first simple approach, the reflection spectrum, transmission spectrum group delay spectrum or portion thereof can be measured and compared with a predicted spectrum. The comparison can then be utilised to determine any change in the intensity and phase requirements which would provide improved results. Of course, the technique of maintaining a substantially stable interference pattern in the reference frame of the fibre 11 is through the saw tooth modulation of the phase delay element 12 as disclosed in Stepanov is preferably also utilised.

Alternative techniques can also be employed. For example, the grating pattern itself can be locally modulated by a small degree in intensity or phase at the point at which the grating is being written. The local wavelength and strength can then be sensed via examination of the modulation reflection spectrum denoted $R(z,L\_o)$ and, if required, the modulation group delay spectrum $P(z,L\_o)$ where $L\_o$ is the wavelength of the probe beam utilised by spectrum analyser 16. Preferably, to maintain the maximum effect, the spectra can be measured from the end of the fibre which is being written such that light does not have to pass through the previously written grating to reach a region currently being processed by UV radiation.

The response of the spectra will most likely be largest when the local Bragg wavelength L is equal to $L\_o$. Hence, dithering of $L\_o$ will provide a signal which gives a maximum response.

More generally, the predicted response can be readily estimated from the knowledge of the previously written $L(z')$, $K(z')$ for $z'<z$, so that a predictor-corrector algorithm can be run in real time to ensure that $L(z)$ is exact and the illumination is terminated when $K(z)$ reaches the desired value.

Given this approach, it is necessary to determine how to apply a modulation of the grating at the point of writing. There are many approaches—use of strain, temperature etc which can be locally induced by a number of means. However, many of these will perturb the interferometer (vibration, thermal gradients etc,) and this is not wise. The interferometer arrangement of mirrors 8, 9 can be modulated (eg the angle) but this may cause a loss in contrast of the written grating.

The preferred method is to modulate the intensity of the writing UV beam by a small amount using intensity modulator 3. It is thought that there is both a permanent grating being written as well as a transient grating (at the same pitch) which decays on the time scale of microseconds as the UV induced defects recombine. Provided that the modulation frequency is les than the relaxation rate, and larger than the rate of traverse of the UV beam over the writing point, then the modulation spectra can provide an accurate measure of $L(z)$ and $K(z)$ through real time computation. There will be a small decrease in the transient response as the grating saturates, but this should be calibrated for. Intensity modulation can be added to the UV beam by adding a high frequency modulation to the AO modulator 3 (or whatever is used).

Alternatively, the spectrum analyser 16 could be simplified such that the average spectrum was measured along with the modulation component (by phase sensitive detection). These signals would be measured as a function of the probe wavelength. Depending on the response function, the probe wavelength may have to be dithered (eg to find the maximum response). There are likely to be points where the sensitivity to modulation may be small due to the influence of the previously written grating. An approach is to set the probe wavelength to the desired Bragg wavelength and change the interferometer to maximise the modulation signal. The DC and AC reflectance can then be used to determine the UV dose The group delay modulation can be measured using an interferometric measurement.

The alternative approach would be to measure using an appropriate double modulation approach whereby the wavelength (or phase) of the source z is modulated at a frequency $\theta_1$ around a set point (determined from the theoretical spectra) and the modulation response is measured to enhance sharp features, and the grating at the point of writing is modulated at frequency $\theta_1$ by any means which changes the local index at the point of writing, and the reflected signal is phase sensitive detected at the sum or difference frequencies $(\theta_1 \pm \theta_2)$. This generic approach to reflection spectroscopy was developed by Manuel Cardona.

It may be the spectral difference of Fabry-Perot resonances is required, and this could be implemented using a matched Fabry-Perot. The double modulation technique described above gives a spectrum which is sensitive to the region in which the spectrum is being written, and its effect on sharp features (eg Fabry-Perot resonances).

Figure 2:
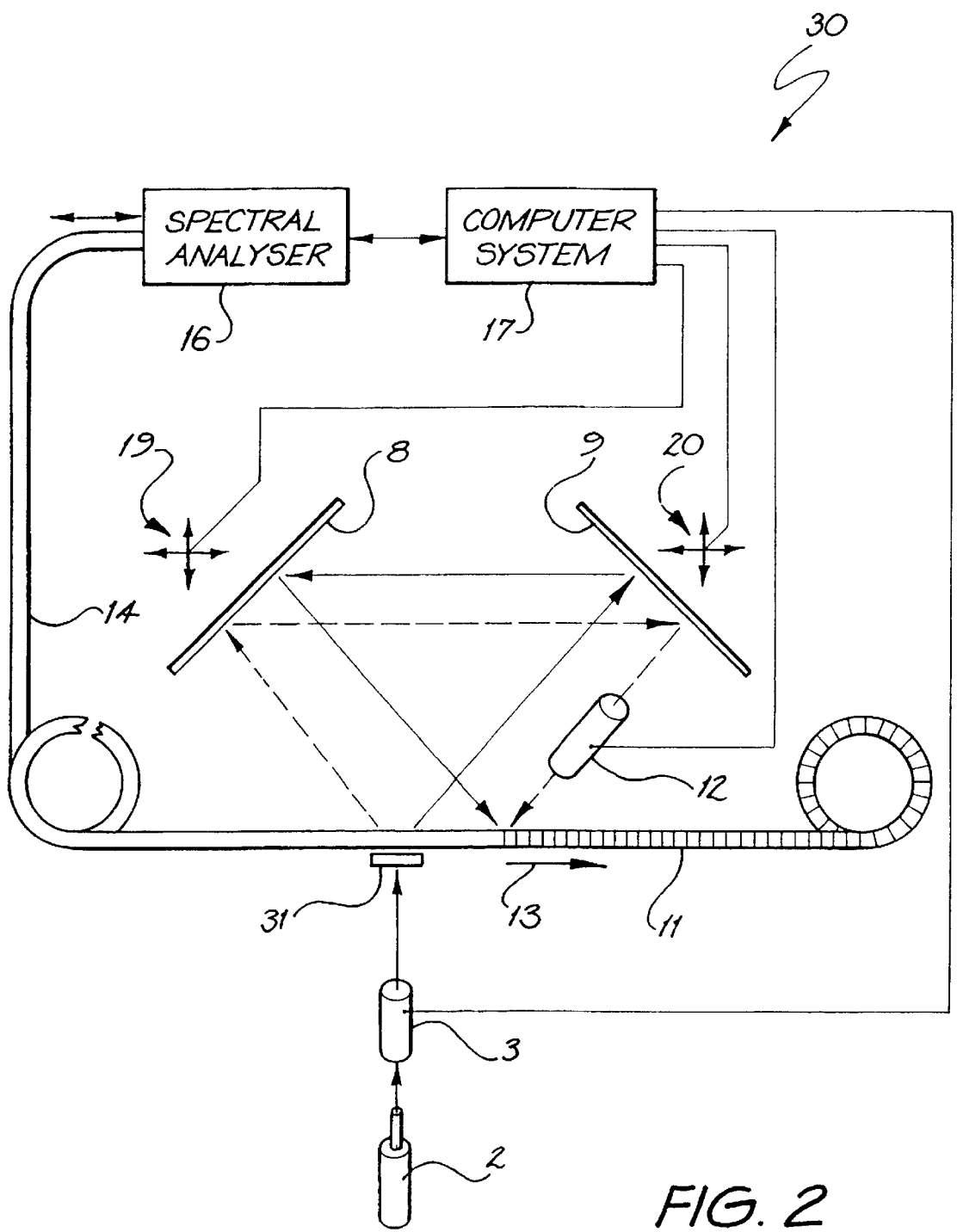
FIG. 2 illustrates and arrangement of a second embodiment of the present invention.

The principles aformentioned can be readily extended to other interferometric writing arrangements. For example, in FIG. 2, there is illustrated and arrangement 30 which is derived from the aforementioned Ouellette et. al. reference as disclosed by the aforementioned Stepanov et. al. reference. In this arrangement, the elements having the same function as in FIG. 1 have their numbers retained. In the arrangement 30, the difference is that a Sagnac type interferometric arrangement is utilized wherein a phase mask 31 splits a coherent input beam into two separate beams one of which is phase moduilator 12 with respect to the other as is taught by Stepanov et. al. However, the principles of FIG. 1 are extended to this arrangement wherein the fibre 14 is interconnected to an analyser 16 which is in turn interconnected to a computer system 17 which controls the translation 19, 20 of the mirrors 8, 9 in addition to the intensity via intensity modulator 3 and the phase via phase modulator 12 so as to provide for an improved grating. The real time control principles as aforementioned can be utilized in this arrangement.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method of forming a complete grating structure in a photosensitive waveguide comprising the steps of:
   (a) writing an initial portion of said structure in said waveguide;
   (b) measuring light propagating properties of said initial portion in said waveguide to determine a series of parameters of said initial portion;
   (c) utilizing said parameters as a feedback to alter the character of a subsequently written portion of said grating structure to provide foran improved form of grating structure;
   (d) iterating said steps (a) to (c) so as to form said complete grating structure.

2. A method as claimed in claim 1 wherein said writing is performed utilizing a coherence pattern formed from the interference of two coherent beams on said waveguide.

3. A method as claimed in claim 1 wherein said characteristics include the intensity or phase of said subsequently written portion.

4. A method as claimed in one of claims 1–3 wherein said testing includes determining the spectral reflectance response, or part thereof, of said initial portion or subsequently written portions, prior to completion of said grating structure.

5. A method as claimed in one of claims 1–3 wherein said testing includes determining the spectral transmittance response, or part thereof, of said initial portion or subsequently written portions, prior to completion of said grating structure.

6. A method as claimed in one of claims 1–3 wherein said testing includes determining the phase delay spectral response, or part thereof, of said initial portion or subsequently written portions, prior to completion of said grating structure.

7. A method as claimed in one of claims 1–3 wherein said step (a) further comprises the step of locally perturbing the intensity, phase or frequency of said grating structure and said step (b) comprises measuring said local perturbation.

8. A method as claimed in claim 7 wherein said local perturbation comprises a periodic modulation.

9. A method as claimed in claim 8 wherein said testing step further comprises measuring sum and difference frequencies for said modulation.

10. A method as claimed in one of claims 1–3 wherein said testing comprises averaging portions of the reflectance, transmittance or group delay spectra of said initial portion and of subsequently written portions, prior to completion of said grating structure.

* * * * *